3,459,785
HYDROGENATION OF DICYANOBUTENE WITH SELECTED RHODIUM(I) CATALYSTS AND A BASIC PROMOTER
Frank N. Jones, Shellburne, Wilmington, Del., assignor to E. I. du Pont de Nemours and Company, Wilmington, Del., a corporation of Delaware
No Drawing. Filed Nov. 21, 1966, Ser. No. 595,584
Int. Cl. C07c 121/26, 121/02; C07b 1/00
U.S. Cl. 260—465.8     9 Claims

ABSTRACT OF THE DISCLOSURE

A process for preparing adiponitrile from 1,4-dicyanobutenes by hydrogenation between 0° C. and 175° C. in the presence of 0.0001 to 5% by total weight of a rhodium(I) catalyst of the formula $R_3PRhXYZ$ or

where X is an anion; B is a halogen anion or hydrogen, R is aryl, Z is $R_3P$ or dicyanobutene, Y is $R_3P$, dicyanobutene or CO, and A is $R_2P$—$R'$—$PR_2$, where $R'$ is a divalent hydrocarbyl group; in the presence of a base promoter. Preferred promoters are inorganic bases such as alkali metal hydroxides, carbonates, phosphates, etc. The process is operable in the presence of impurities present in most commercial dicyanobutenes.

---

This invention relates to a process for hydrogenating dicyanobutenes. More specifically, the invention concerns a method of hydrogenating dicyanobutenes with selected rhodium(I) catalysts and a basic promoter to obtain adiponitrile.

Adiponitrile is well known as the precursor of hexamethylenediamine, which is used in preparing polyamides by reaction with adipic acid. Thus, it is desirable to find a simple, inexpensive method for reducing 1,4-dicyanobutenes to adiponitrile. It has recently been found that this reduction could be carried out with selected rhodium(I) catalysts in a homogeneous system which needed no purification of the 1,4-dicyanobutenes to remove impurities, such as the cyanide ion, that retarded the reaction or poisoned the catalyst. It has now been found that the rate of this reduction is greatly and unexpectedly increased by the presence of a basic promoter.

Thus, the process of this invention is accomplished by reacting at least one 1,4-dicyanobutene with hydrogen at a temperature of between about 0–175° C. in the presence of 0.0001–5% by weight of a rhodium(I) compound selected from the formulas:

(1)     $R_3PRhXYZ$ wherein X is an anion defined below; Y is selected from CO, $R_3P$ or dicyanobutene; Z is selected from $R_3P$ or dicyanobutene; and R is aryl of 6–10 carbon atoms;

(2) 

wherein B is selected from hydrogen and X, wherein X is defined as above; and A is a divalent group of the formula $R_2P$—$R'$—$PR_2$ wherein R is defined as above and $R'$ is a divalent hydrocarbyl group of 2–6 carbon atoms; and in the presence of 0.001 to 50 percent, by weight of dicyanobutene, of a base.

The X component of the catalyst of Formula 1 is defined as a halogen anion selected from chlorine, bromine or iodine, preferably chlorine.

A more specific definition of the base is that it is a substance that contains an oxyanion and has a pH of greater than 7.0, and preferably a pH of between 9.0–12.8, when dissolved in water at a concentration of 0.1 molal or when dissolved to saturation if that is less than 0.1 molal. Thus, the base can be either inorganic or organic. Examples of inorganic bases, which are preferred, include alkali metal or alkaline-earth metal hydroxides, carbonates or phosphates, such as sodium hydroxide, calcium hydroxide, magnesium hydroxide, cesium hydroxide, sodium carbonate, potassium carbonate, calcium carbonate, sodium sesquicarbonate, trisodium phosphate, disodium phosphate, and the like; in addition, other bases such as silver oxide, ferrous hydroxide, ferric hydroxide, borax, and the like, can be employed.

Examples of organic bases which are preferred include the alkali metal or alkaline earth metal salts of carboxylic acids of up to 18 carbon atoms, and hydrocarbon alcohols of up to 10 carbon atoms, such as sodium formate, potassium acetate, lithium oxalate, cesium tartarate, calcium isobutyrate, barium succinate, lithium stearate, zinc benzoate, sodium methoxide, potassium t-butoxide, triphenylmethyl sodium and potassium acetylacetonate. The amount of base employed is preferably from 0.05 to 1% by weight of dicyanobutene.

An inorganic base is preferred, especially sodium carbonate.

A solvent is not necessary, for the dicyanobutene can act as a solvent for the catalyst and the base. However, a wide variety of inert solvents can be employed, such as aromatic or aliphatic hydrocarbons, halogenated hydrocarbons, ethers, esters, amides, sulfoxides, alcohols, or ketones. It is convenient to employ benzene as a solvent since 1,4-dicyanobutenes are prepared commercially in benzene solution and this solution can be employed directly. In addition, since trans-1,4-dicyanobutene melts at 74–76° C., a solvent is needed if the reaction is carried out with this isomer at temperatures below 74–76° C.

Pressure is not critical and sub- or superatmospheric pressures can be employed. However, the reaction rate increases with increasing pressure and superatmospheric pressures from about 10 to about 5000 p.s.i. are ordinarily used.

The reaction vessel should be constructed of, or lined with, a non-reactive material such as silver or steel.

The catalyst can be prepared and added as such, or it can be prepared in situ, e.g. by charging $RhX_3$ or $Rh_2(CO)_4Cl_2$ and $R_3P$ to the reaction mixture.

The R group of the $R_3P$ ligand is aryl of 6–10 carbon atoms; and the preferred aryl group is phenyl.

$R'$ is preferably unsubstituted and is alkylene or arylene (most preferably phenylene).

Specific examples of the $R_3P$ ligands include:
tris(1-naphthyl)phosphine
tris(9-phenanthryl)phosphine diphenyl-4-methylphenylphosphine
phenyl bis(3-methylphenyl)phosphine
bis(1-naphthyl)phenylphosphine
tris(2-methylphenyl) phosphite
tris(1-anthryl) phosphite
tris($\alpha$-menthyl) phosphite
o-phenylenebis(diethylphosphine)
ethylene-1,2-bis(diphenylphosphine)

In the salt-containing ligands, the cation is preferably alkali metal.

The amount of catalyst employed is preferably 0.01 to 2 percent by weight of the dicyanobutenes.

The rhodium catalysts in solution with dicyanobutene form complexes with 1,4-dicyanobutenes of Formula 1 where Y and/or Z are dicyanobutene. These complexes may be isolated, if desired, and used themselves as the catalyst in the process of this invention. In addition, other olefins form complexes with the rhodium catalysts and these complexes may be used to catalyze the process of this invention. Examples of olefins which can replace dicyanobutene in the terms Y and Z include hexene-1, octene-1, 1,5 - cyclooctadiene, acrylonitrile, 1,2 - dicyanoethylene, maleic anhydride, styrene and the like.

After the reaction is complete, the base and catalyst remain in solution and the catalyst retains its activity. While it is possible to recover solid catalyst, it is preferred to separate only a portion of the adiponitrile and to reuse the catalyst as a relatively concentrated solution in adiponitrile. This can be done by distillation, partial crystallization, selective absorption, or by liquid-liquid extraction of adiponitrile. In liquid-liquid extraction, any solvent or mixtures of solvents which will separate the catalyst from the adiponitrile can be employed. For example, acetonitrile, methanol or ethanol with water, halogenated hydrocarbons, and the like can be used to form two liquid phases with the reaction solvent.

The reaction can be carried out in batch or in a continuous manner. Any of the methods of separating the product can be adapted for continuous operation so as to continually remove adiponitrile and recycle the catalyst and base.

The process of the invention is operable in the presence of impurities present in dicyanobutenes prepared commercially. For example, sodium cyanide, trans-1,4-dichloro-2-butene and cuprous chloride do not affect the reaction adversely. It is preferable, however, to prolong catalyst life and obtain maximum reaction rates, to pretreat the dicyanobutene reactants with alkali metal hydroxide, either as a solid or in dilute solution.

The examples that follow illustrate the process of the invention in further detail, but the invention is not to be considered limited to the example disclosures. All example reactions were carried out in a silver-lined steel pressure vessel having a volume of 400 ml.

Example 1

A charge of 100 ml. of dicyanobutenes (which contained about 61.7% of cis-1,4-dicyanobutene-1, 31.5% of trans-1,4-dicyanobutene-1, 5.9% of an approximately 96:4 mixture of trans- and cis-1,4-dicyanobutene-2, 0.2% of 1,2-dicyanobutene-2, 0.1% of cis-1,2-dicyanobutene-1 and 0.6% of dicyanovinylcyclohexenes), 2.0 g. of tris-(triphenylphosphine)rhodium(I) chloride, and 3.0 g. of sodium carbonate were placed in the reaction vessel. The vessel was evacuated, and hydrogen was admitted to give a pressure of 2400 p.s.i. at 32° C. The tube was warmed to 50° C., and the hydrogen pressure was increased to 4000 p.s.i. Hydrogen absorption occurred during an exothermic surge from 50 to 90° C. which occurred when the mixture was first heated under 3000–4000 p.s.i. hydrogen pressure. The reaction was virtually complete (over 99% of theory) within 8 minutes. The product was a dark red liquid containing suspended solid, presumably sodium carbonate; the N.M.R. spectrum of the filtered solution was that of pure adiponitrile containing a trace of dissolved catalyst.

In contrast, when no sodium carbonate was present in the charge, absorption of hydrogen was very slow at 50° C. The amount of hydrogen absorbed was only 5% of theory in one hour.

Example 2

In a pressure tube was placed a charge identical to that of Example 1 except that 1 g. of sodium cyanide was added in addition to the sodium carbonate. The tube was evacuated and agitated at 75° for 15 minutes. Hydrogen was added to give a pressure of 500 p.s.i. Hydrogen absorption began immediately and continued for 1.5 hours at 300–500 p.s.i., hydrogen being added intermittently. Agitation was continued for 2 hours at 75° C. and 500 p.s.i. The product was virtually pure adiponitrile by N.M.R. but contained detectable traces of dicyanobutenes and catalyst ($\tau$=2.43).

Example 3

In a pressure tube was placed 60 g. of benzene, 40 g. of dicyanobutenes described in Example 1, 1 g. of tris-(triphenylphosphine)rhodium(I) chloride, 1 g. of sodium cyanide and 2 g. of sodium carbonate. The tube was chilled in a solid-carbon dioxide-acetone bath, evacuated, warmed to room temperature and pressured to 1000 p.s.i. with hydrogen. The tube was agitated and warmed over a period of 25 minutes to 90° C. with periodic additions of hydrogen; pressure varied from 780–4000 p.s.i. The tube was agitated at 90° C. for 4 hours and at 125° C. for 8 hours at hydrogen pressures of 4000–4300 p.s.i. Consumption of hydrogen was complete after the initial heating-up stage. The product was 103.2 g. of a dark red solution containing suspended sodium carbonate and sodium cyanide. The solution was carefully filtered through a mat of diatomite filter aid. Gas chromatography showed the filtrate to contain, besides benzene, 99.5% of adiponitrile, 0.4% of an impurity which had the retention time characteristic of 1,2-dicyanobutane, and traces of four substances, none being dicyanobutenes. The N.M.R. spectrum confirmed this analysis.

A 75 g. sample of this filtrate was distilled at a pressure of 1$\mu$ to remove the benzene and most of the adiponitrile. The residue (7.7 g.) was a dark red solution of catalyst in adiponitrile. This solution was filtered through a diatomite filter aid, and 5.0 g. of the clear filtrate was placed in a silver-lined steel tube with 40 g. of dicyanobutenes described as in Example 1, 60 g. of benzene, 0.5 g. of sodium cyanide and 1.0 g. of sodium carbonate. The mixture was treated with hydrogen for 6 hours at 50° C. and 4000 p.s.i. and for 6 hours at 90° C. and 5000 p.s.i. The product was a red solution. Analysis by N.M.R. showed that about 20% of the 1,4-dicyanobutenes had been converted to adiponitrile. Gas chromatography showed the product to contain, besides benzene, 19.8% of adiponitrile.

Example 4

The charge used in this example was identical to that of Example 3 except that 3 g. of sodium carbonate was used instead of 2 g. The reaction was run for 6 hours at 50° C. and 6 hours at 100° C. at a hydrogen pressure of 2500 to 2650 p.s.i. The reaction was essentially complete at the end of the first 3 hours. The product was 102 g. of dark red liquid containing suspended solid. The N.M.R. spectrum showed virtually complete conversion to adiponitrile.

The solution was filtered under nitrogen. The benzene was distilled under reduced pressure. A 35 g. sample of the residual red solution was quickly cooled with stirring in a bath at −30° C. until it had partly solidified. Filtration gave about 12 g. of solid and about 23 g. of liquid. Spectrophotometric analysis showed that the intensity of the red color due to rhodium(I) compounds in the liquid was greater by a factor of 1.6 than in the solid which had been removed by filtration and melted. Both fractions were protected from air.

A 19 g. sample of the liquid from the above process was placed in a tube along with 40 g. of dicyanobutene isomer mixture described as in Example 1, 60 g. of benzene and 3 g. of sodium carbonate. Hydrogenation was effected at 2500 p.s.i. as described above in this example. The N.M.R. spectrum of the product showed virtually complete conversion of 1,4-dicyanobutenes to adiponitrile. Gas chromatography showed the product to contain, besides benzene, 98.4% of adiponitrile; unreacted dicyanobutenes were not detected.

Example 5

The charge and technique of this example was like that of Example 1 except that just 1.0 g. of tris(triphenylphosphine)rhodium(I) chloride was used and 4.0 g. of solid sodium hydroxide was added in place of the sodium carbonate. A temperature surge from 50° C. to 64° C. occurred; the reaction was virtually complete in 10 minutes. The filtered liquid was shown by N.M.R. to be virtually pure adiponitrile.

Example 6

The procedure of Example 5 was repeated except that 3.0 g. of anhydrous disodium hydrogen phosphate was used instead of sodium hydroxide. The reaction was complete after about 10 hours at 50° C. and 2500 p.s.i.

Example 7

The charge and technique used in this example were identical to that of Example 1 except that 1 g. of sodium cyanide was additionally added. The result was virtually identical. The exothermic surge was from 40° C. to 98° C. and the reaction was virtually complete within 6 minutes.

Example 8

In an experiment identical to Example 1 except that 5 g. of cuprous cyanide was added in place of sodium cyanide and sodium carbonate, fairly rapid hydrogenation occurred during 25 minutes at 37–50° C. and 2550–4000 p.s.i. Slow absorption of hydrogen continued at 50° C. for 7 hours and at 100° C. for 3 hours. The product was 104 g. of liquid containing suspended solid. After filtration, the filtrate was shown by N.M.R. to contain about 74% of adiponitrile and 26% of unconverted mixed dicyanobutenes.

Example 9

A benzene solution of dicyanobutenes (predominantly trans-1,4-dicyanobutene-2) was obtained directly from the reaction of 1,4-dichlorobutene-2 with sodium cyanide; it contained cuprous cyanide, hydrogen cyanide, 1,4-dichlorobutenes and water. The mixture was washed in a countercurrent flow apparatus with dilute aqueous sodium hydroxide at 80° C. A 100 g. sample of the solution was placed in a tube with 1.5 g. tris(triphenylphosphine)rhodium(I) chloride and 3 g. of sodium carbonate. Hydrogenation was complete in about 20 minutes at 80–91° C., 2500 p.s.i. The N.M.R. spectrum and gas chromatogram showed complete conversion of 1,4-dicyanobutenes to adiponitrile.

Example 10

A procedure similar to that of Example 1 was used. The charge was 100 g. of refined plant-stream dicyanobutenes, 0.80 g. of di-[1,2-bis(diphenylphosphino)ethane]rhodium(I) chloride [prepared by the method of A. Sacco and R. Ugo, J. Chem. Soc. 2374 (1964)] and 1 g. of sodium carbonate. The mixture was treated with hydrogen at 3900–5000 p.s.i. and 70–80° C. for 11 hours. Hydrogen uptake was virtually complete in the first 25 minutes. The product was 99.5 g. of yellow liquid whose N.M.R. spectrum was that of adiponitrile having a little dissolved catalyst. No unreacted dicyanobutene was detected.

Example 11

A stainless steel-lined reactor whose approximate volume was 400 ml. was charged with 100 g. of refined plant-stream dicyanobutene, 1.0 g. sodium carbonate and 0.1 g. of tris(triphenylphosphine)rhodium(I) chloride. The tube was agitated at 98–108° C. with a hydrogen pressure of 300–600 p.s.i. for six hours. Hydrogen uptake was nearly complete in 45 minutes. Gas chromatography showed that the product contained 96.2% of adiponitrile and 2.3% of unreacted dicyanobutenes. The N.M.R. spectrum confirmed this analysis.

Example 12

The procedure of Example 11 was repeated in all respects except that 0.10 g. of tris(triphenylphosphine)rhodium(I) bromide was used as catalyst. The reaction was run for six hours at 99–102° C. and 450–600 p.s.i. Hydrogen uptake was virtually complete after four hours. The N.M.R. spectrum of the product showed adiponitrile containing only traces of catalyst and unreacted dicyanobutene.

Example 13

A stainless steel-lined reactor whose approximate volume was 400 ml. was charged with 100 g. of refined plant-stream dicyanobutenes, 2.0 g. of sodium benzoate, and 1.0 g. of tris(triphenylphosphine)rhodium(I) chloride. The tube was evacuated and heated to 50° C. Hydrogen was then added to give a pressure of 2500 p.s.i.; rapid uptake occurred, and the temperature jumped to 80° C. The reaction was virtually complete in less than 13 minutes at pressures of 1700 to 2500 p.s.i. and temperatures of 50–80° C.; the reaction was continued for 47 more minutes at 49–55° C. and 2200–2450 p.s.i. The N.M.R. spectrum showed complete conversion to adiponitrile; no traces of unreacted dicyanobutenes were detected.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing adiponitrile which comprises reacting 1,4-dicyanobutene with hydrogen at a temperature of between about 0–175° C. in the presence of 0.0001 to 5 percent by weight of a rhodium(I) compound selected from the formulas consisting of $$(R_3P)RhXYZ$$

wherein X is chlorine, bromine or iodine; Y is selected from the class consisting of CO, $R_3P$ and said dicyanobutene; Z is selected from the class consisting of $R_3P$ and said dicyanobutene; R is aryl of 6–10 carbon atoms; and

wherein B is selected from the class consisting of hydrogen and X; and A is a divalent group of the formula $R_2P—R'—PR_2$ wherein R' is a divalent hydrocarbyl group of 2–6 carbon atoms, and X and R are defined as above, and in the presence of 0.001 to 50 percent by weight of dicyanobutene, of a base said base having a pH of between 9.0 and 12.8 when either dissolved in water at a concentration of 0.1 molal or dissolved to saturation if such is less than 0.1 molal.

2. The process of claim 1 wherein the rhodium(I) compound is $(R_3P)RhXYZ$.

3. The process of claim 1 wherein the rhodium(I) compound is

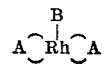

4. The process of claim 1 wherein the rhodium(I) compound is of the formula $$(R_3P)RhXY'$$

wherein R and X are as defined in claim 1 and Y' is selected from the class consisting of —CO and $R_3P$.

5. The process of claim 1 wherein the rhodium(I) compound is of the formula $$(R_3P)_3RhX$$

wherein R and X are defined as in claim 1.

6. The process of claim 1 wherein the rhodium(I) compound is of the formula $(R_3P)RhXYZ$ in which R is aryl of 6 through 10 carbon atoms, and X, Y and Z are defined as in claim 1.

7. The process of claim 1 carried out in an inert solvent.

8. The process of claim 7 wherein the solvent is benzene.

9. The process of claim 1 wherein the base is sodium carbonate.

References Cited

UNITED STATES PATENTS

| | | | |
|---|---|---|---|
| 2,999,107 | 9/1961 | Lindsey et al. | 260—465.8 |
| 3,110,747 | 11/1963 | Mullineaux | 260—683.9 |
| 3,130,237 | 4/1964 | Wald | 260—638 |
| 3,366,646 | 1/1968 | Dewhirst | 260—465.1 XR |

OTHER REFERENCES

Young et al.: Chem. Communications, 1965, pp. 131–132.

JOSEPH P. BRUST, Primary Examiner